Jan. 28, 1969

W. E. BARBEE 3,423,847

BOOKKEEPING AID

Filed May 11, 1967

Walter E. Barbee
INVENTOR.

BY *Clarence A. O'Brien*
and *Harvey B. Jackson*
Attorneys

United States Patent Office 3,423,847
Patented Jan. 28, 1969

3,423,847
BOOKKEEPING AID
Walter E. Barbee, P.O. Box 912,
Grenada, Miss. 38901
Filed May 11, 1967, Ser. No. 637,835
U.S. Cl. 35—24
Int. Cl. G09b 19/18
6 Claims

ABSTRACT OF THE DISCLOSURE

A circular or any shaped board or disk having rotatably mounted thereon a rotating board or disk against both surfaces of the first mentioned board or disk thus forming a center disk and two rotatable disks of smaller diameter for use in aiding in various aspects of bookkeeping and especially when instructing students in various bookkeeping techniques and procedures. The structural components of the bookkeeping aid employ a coloring plan in which all income and liability columns are printed in "RED." The "RED" color here indicates that this is a credit or liability and thus the credit for income as well as the credit for liability indicates a minus figure, being a liability of the company to the owners of the company. Likewise a debit is printed in "BLACK" on a white background. The bookkeeping aid also includes instructions relating to proper closing entries at the end of a fiscal period.

---

The present invention generally relates to a bookkeeping aid having a central disk with material located on both surfaces thereof together with two smaller disks, one on either side of the central disk, rotatably secured to the central disk and having structural relationship to the center disk for instructing the user properly in various bookkeeping steps and techniques.

An object of the present invention is to provide a bookkeeping aid having certain areas thereof provided with contrasting colors which have the unique application to bookkeeping techniques to facilitate proper bookkeeping and to facilitate the instruction of students in proper bookkeeping techniques and procedures.

Still another object of the present invention is to provide a bookkeeping aid having a novel association of rotatable components, windows for revealing underlying indicia and a pointer type indicator for association with underlying portions of a center disk in order to properly position and relate the disks for indicating various procedures and techniques in bookkeeping.

Yet another object of the present invention is to provide a bookkeeping aid which is central in construction, easy to use, effective for its particular purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
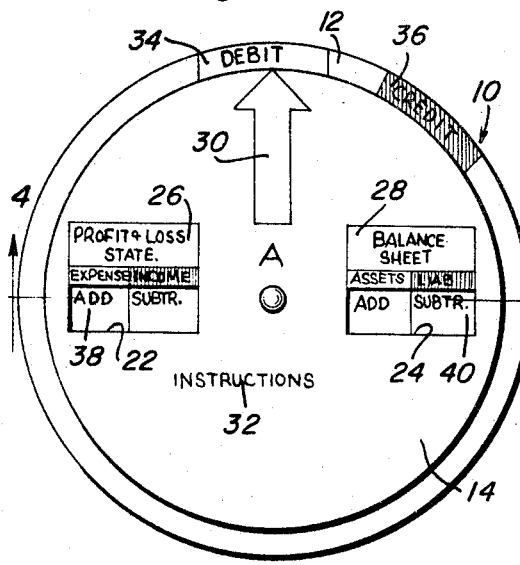
FIGURE 1 is a plan view of side A of the bookkeeping aid.

Referring now specifically to the drawings, the bookkeeping aid comprising the present invention is generally designated by the numeral 10 and includes a central disk 12, side A disk 14 and a side B disk 16 disposed on opposite sides of the center disk 12 with the three disks being rotatably joined together by a suitable fastener 18 such as a conventional paper fastetner having a headed end on a pair of laterally bendable wings which are spread apart after the fastener 18 has been inserted through aligned holes 20 in the disk. Any suitable structure may be employed for rotatably securing the disks together and retaining them in overlying contacting relation such as a suitable rivet through eyelets or the like. The disks 14 and 16 are of lesser diameter than the center disk 12 and the side A disk 14 is slightly larger than the side B disk 16 but is also of lesser diameter than the center disk so that a peripheral portion of both sides of the center disk 12 is exposed or revealed during normal operation of the bookkeeping aid.

The side A disk 14 has a pair of diametrically aligned windows 22 and 24 therein each of which are generally rectangular in configuration. Disposed above the window 22 is an enclosed area 26 having "Profit and Loss Statement" printed thereon and between the top edge of the window 22 and the enclosed area 26 are two smaller areas having "Expense" and "Income" printed therein with the word "Expense" being printed in black on a white background while the word "Income" is printed on a red background or may be printed in red on a white background. The words "Profit and Loss Statement" are printed in black on a white background.

Disposed above the window 24 is an enclosed area 28 having the words "Balance Sheet" printed in black on a white background. Below the enclosed area 28 and immediately above the top edge of the window 24 are two smaller areas having the word "Assets" printed in black on a white background and the word "Liabilities" printed in black on a red background or printed in red on a white background. Intermediate the windows 22 and 24 and extending to the periphery of the disk 14 at a point circumferentially between the windows 22 and 24 is an enlarged indicating arrow 30 printed in black with the entire disk 14 providing a white background. Provided across the bottom surface area of the disk 14 as observed in FIGURE 1 is instructional indicia 32 indicating the manner of use of the bookkeeping aid insofar as manipulation of both of the disks 14 and 16 is concerned.

The surface of the center disk 12 which underlies side A disk 14 is provided with a pair of circumferentially spaced peripheral areas 34 and 36. The area 34 has the word "Debit" printed in blank on a white background while the area 36 has the word "Credit" printed thereon in a red background or printed in red on a white background. These two words are disposed peripherally of the disk 14 and are observable along the peripheral edge of the disk 14 so that the disk 14 may be oriented so that the arrow 30 will point to either of these words by rotating the disks 14 in an appropriate manner.

Also printed on the center disk 12 in underlying relation to the disk 14 for observation through the windows 22 and 24 are two pairs of enclosed areas 38 and 40. The areas 38 and 40 are diametrically arranged and each area is divided into two equal areas for alignment with the small areas located above the respective windows 22 and 24. The pair of areas 38 and 40 are printed in black on a white background and will be observed through the windows 22 and 24 when the arrow 30 is located to point to the word "Debit" in the area 34. Underlying the word "Expense" above the window 22 will be the words "Add to Expense" and underlying the word "Income" are the word "Subtract from Income" also printed in black on white. The other area 40 is also divided into two sections and has the words "Add to Assets" underlying the word "Assets" and "Subtract from Liabilities" underlying the word "Liabilities." The center disk 12 also has another pair of similarly disposed areas which are alignable with the windows 22 and 24 when the arrow 30 is directed toward the word "Credit" in the area 36. The pair of areas aligned with the windows 22 and 24 when the arrow 30 points toward the word "Credit" will be printed in black on a red background or printed in red so that it will be identified with the same color or color designation employed in the area 36. These areas which are printed on a red background or printed in red will have the words "Subtract from Expense" underlying the word "Expense" above the window 22 and the words "Add to Income" underlying the word "Income" in window 22 and will have the words "Subtract from Assets" underlying "Assets" above window 24 and the words "Add to Liabilities" underlying the word "Liabilities" above window 24.

The side B panel 16 has a radially extending window 42 which has radially diverging edges to reveal a portion of the underlying center disk 12. Extending from the inner end of the window 42 is an indicating arrow 44 terminating adjacent the periphery of the disk 16. On one side of the arrow 44 is an area 46 having the words "Profit and Loss Statement" thereon and on the opposite side of the arrow 44 is a similar area 48 having the words "Balance Sheet" printed thereon. Under the area 46 are two columns 50 and 52 with the column 50 being headed by the word "Expense" and the column 52 being headed by the word "Income." The column 52 is provided with a red background or the word "Income" may be printed in red on a white background. Under the area 48 is a similar pair of columns 54 and 56 with the column 54 having a white background with the word "Assets" printed in black thereon as a heading. The column 56 is provided with a red background and has the word "Liabilities" as a heading either printed in black on the red background or printed in red on a white background. In each column, there is a list of representative items that would fall within that category. For example, in the column 50 under the word "Expense," there may be printed items such as "Rent Paid, Salaries, Supplies, Auto Expense, Insurance, Taxes Paid, Etc." Additional items may be provided under each of the headings in each of the columns as may be considered appropriate. Printed across the top portion of the disk 16 is instructional indicia relating to the columns indicating that the columns may be used to list your own schedule of accounts to be studied or used.

The center disk 12 is provided with peripheral areas 58, 60, 62 and 64 which have headings "Expense, Income, Assets and Liabilities." The area 58 is divided into two subheadings "To Add" and "To Subtract" and the area 62 is provided with the same two subheadings. The areas 60 and 64 each are provided with two subheadings "To Subtract" and "To Add" and the areas 60 and 64 are provided with a red background or the indicia thereon may be printed in red on a white background while the areas 58 and 62 have the areas thereon printed in black on a white background.

Printed on the panel 12 for observation through the window 42 is a plurality of circumferentially spaced areas 66 which are comparable in size to the size of the opening 42. The areas 66 are alternatively provided with a red background and a white background with the word "Credit" printed in the red background areas and the word "Debit" printed in black on the white background areas. The areas 66 are so arranged that as the arrow 44 is associated with the peripheral areas 58, 60, 62 and 64 and more specifically the subheadings employed with these areas, the various areas 66 will be revealed through the opening 42. When the arrow 44 is aligned with the words "To Add" in the area 58, a white background with the word "Debit" printed thereon will be revealed through the opening 42 and as the arrow 44 is rotated clockwise as viewed in FIGURE 2, the area 66 will be alternately viewed through the window 42 to indicate the proper entry to be made depending upon whether the four categories of the heading 58, 60, 62 and 64 are to be added or subtracted.

Also provided on the disk 12 in diametrically opposed relation to the areas 58, 60, 62 and 64 are two areas 68 and 70 which are subdivided into a white background area and a red background area. Area 68 has the words "To Close" thereon and is divided into two areas with the white area having the words "Expense Into Profit and Loss" thereon and the red area having the words "Income Into Profit and Loss" thereon. The other area 70 has the words "To Close" as a heading and the white area has the words "Loss Into Capital" thereon and the red area has "Profit Into Capital" and the area 70 also may have as a portion of the heading the words "Profit and Loss Into Capital" to facilitate closing entries at the end of a fiscal period.

The center disk 12 may be of other shapes rather than circular and may be constructed of any suitable material for the purpose such as cardboard or the like and may conveniently be 7½ inches in diameter for ease of handling, storing and the like. The printing of the words in black on white or in black on red or in red on white enables the student, teacher, bookkeeper or user of the device to associate these colors with fingers usually written in this color. In other words, a student, teacher, bookkeeper or user having already studied the subject of bookkeeping will have associated "Debit" as being a figure usually written in black. Also, the word "Debit" should be, although not mandatory, on the left of the word "Credit," thus associating the left side of any bookkeeping entry as a "Debit" and associating the "Credit" as being on the right side of a bookkeeping column. The word "Credit" will be printed, written or indicated in any manner desirable to the right of the word "Debit." The word "Credit" is printed, written or so indicated in any manner, in red letters or when written in any other color then it should have a red background. The reason for this is that the student, teacher, bookkeeper or user of the bookkeeping aid, having studied the subject for a short time, will associate "Credit" a being a figure usually written in this color. Also, the red figure is normally thought to "Subtract" from Assets or Expenses and to "Increase" or add to Liabilities or Income. As illustrated in the drawings, the side A disk 14 has the words "Debit" and "Credit" located so that the "Debit" is to the left of "Credit." Also, the windows are orientated to the left and right of the pivot point respectively. Above the window 22, the heading may be "Profit and Loss Statement" as illustrated or it may be "Income and Expense Statement" or "Operating Statement" whichever is desirable. By indicating the window in this manner, it will have a tendency to formulate in the user's mind the association of Expense and Income items as those to be used in later making up any profit and loss statement. Above the right window, the heading may be "Balance Sheet" as illustrated or "Financial Statement" whichever is desired. By indicating in this manner, it will have a tendency to formulate in the user's mind the association of "Assets and Liabilities" as those items to be used in later making up any Balance Sheet.

FIGURE 1 illustrates the position of the disk 14 when the arrow 30 is pointing to the word "Debit" on the periphery of the disk 12. In this position, the words "Add to Expense" are revealed under the word "Expense" and the purpose of this is that by turning the arrow to "Debit" the user can look through the opening and see the effect a "Debit" will have on an expense account. Also, in this position, the arrow will point toward "Debit" and under the word "Income" in the left window, there will appear the indicia "Subtract from Income" indicating that a "Debit" will "Subtract from Income." With the arrow still in the same position towards "Debit," there will appear in the opening on the right side of the pivot, under the word "Asset," to show that the "Debit" will have the effect of "Adding to Assets." With the arrow still in the same position, pointing to "Debit" on the center disk 12, there will appear through the window 24 under the word "Liabilities" printing to indicate that a "Debit" will have the effect of "Subtracting from Liabilities."

With the arrow 30 on the disk 14 pointing to "Credit" on the center disk 12, the window 22 will reveal under the word "Expense" that a credit will "Subtract from Expense" and will show under the word "Income" that a credit will "Add to Income." In the window 24, under the "Assets," the printing on the center disk 12 will show that a credit will have the effect of "Subtracting from Assets," and under the word "Liabilities" will show that a credit will have the effect of "Adding to or Increasing" a Liability Account.

By lining up the words "Expense," "Income," "Assets," "Liabilities," in this manner from left to right, the user will associate these positions with the order in which they will appear on the work sheet which they will either study later or will have already studied.

Figure 2:
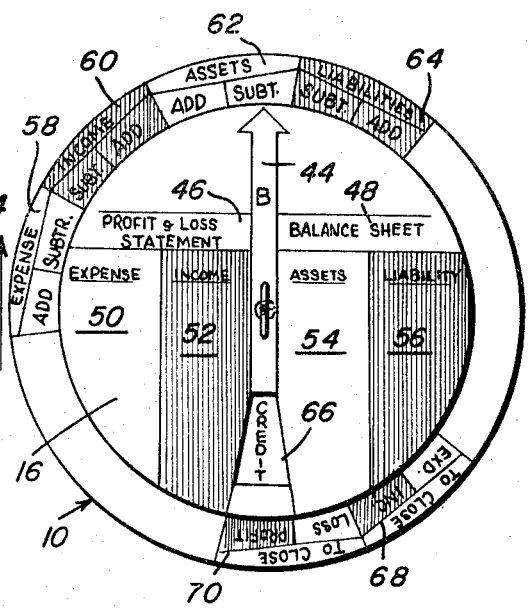
FIGURE 2 is a plan view of side B of the bookkeeping aid.
Figure 3:
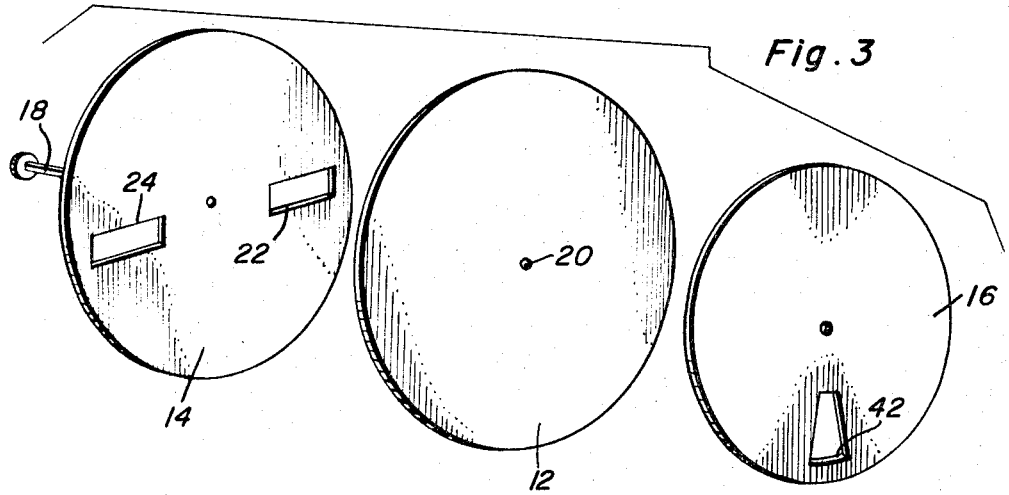
FIGURE 3 is an exploded group perspective view of the three disks employed in the bookkeeping aid.
Figure 4:
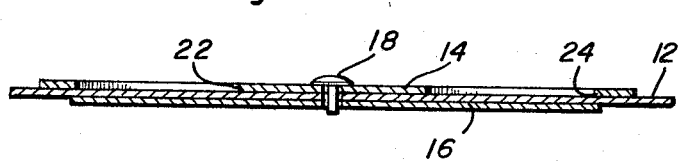
FIGURE 4 is a sectional view taken substantially upon a plane passing along section line 4—4 of FIGURE 1 illustrating the superimposed relationship of the disks.

The side B disk 16 has the printing as illustrated in FIGURE 2 thereon and the side of the center disk 12 which underlies the disk 16 also has printing thereon as illustrated in FIGURE 2. When the arrow 44 on the disk 16 points to "To Add" under "Expense," the printing on the center disk 12 will indicate the word "Debit" being the appropriate bookkeeping entry to make for adding any expense account. Under the word "Income" on the left side on the center disk 12 is printed the words "To Subtract." On the right side will be printed the words "To Add." When the arrow on the disk 16 is positioned to "To Subtract" under "Income" the printing on the center disk will indicate the word "Debit" being the appropriate entry for the user to make. When the arrow on the disk 16 is positioned to "To Add" under "Income" the printing on the center disk which can be seen through the opening 42 will indicate "Credit" being the appropriate entry for the user to make. Under the word "Assets" on the left side, on the center disk 12, will be printed the words "To Add" and on the right side will be printed the words "To Subtract." When the arrow on the disk 16 is positioned to point to "To Add" under "Assets," the printing on the center disk which can be seen through the opening 42 of the disk 16 will indicate "Debit" being the appropriate entry for the user to make to add to an Asset. When the arrow on the outer disk is positioned to "To Subtract" under "Assets" the printing on the center disk which can be seen through the opening 42 of the disk 16 will indicate "Credit" being the appropriate entry for the user to make to subtract from an asset. Under the word "Liabilities" on the left side, on the center disk, will be printed the words "To Subtract" and on the right side will be printed the words "To Add." When the arrow on the disk 16 is positioned to "To Subtract" under "Liabilities," the printing on the center disk that can be seen through the opening or window of the outer disk will show "Debit," being the appropriate entry for the user to make to subtract from a liability. When the arrow on the disk 16 is positioned to "To Add" under "Liabilities," the printing on the center disk that can be seen through the opening or window 42 will show "Credit" being the appropriate entry for the user to make to add to a liability account.

By employing this technique, the student will associate in his mind the appropriate entry to make should it be desirable to "Add to an Expense Account," "Subtract from an Expense Account," "Subtract from Income," "Add to Income," "Add to Assets," "Subtract from an Asset Account," "Subtract from a Liability Account," or "Add to a Liability Account." With the knowledge of what the account is a record of, the student or user can simply select the action to be taken from his problem in his textbook, turn the indicator either side A or side B and select the question with the corresponding answer, and have the mental picture of the transaction which will facilitate his learning of the transactions. By employing this visual instruction aid, the proper transactions will be more readily understood and remembered by a student. By using disk A and by positioning the arrow to either "Debit" or "Credit," one can tell at a glance the whole effect that either the debit or credit will have on either of the categories that an account would be classified. Disk B will indicate the effect of the transaction to be made in making up a "Profit and Loss Statement" or "Balance Sheet." The columns on disk B may be those to be considered in a practice set being used by a student or teacher or the expense accounts used daily in a particular business. The columns may be printed or left blank and each column could be completed by writing in or pasting in a schedule of accounts.

The areas 68 and 70 relate to a phase of bookkeeping which tends to confuse the student which is the closing entries to be made at the end of a fiscal period. Students have usually learned what effect the "Debit" and "Credit" have on an "Asset," "Liability," "Income" or "Expense." However, the closing entries are somewhat opposite to what the student has previously learned. On disk 12 of the device at the periphery thereof is indicia at the periphery and in underlying relation to the disk 16 of a correct "Debit" and corresponding "Credit" to be made in closing "Expense" into "Profit and Loss" and these can be seen through the opening in the disk 16. The same applies to closing "Income" into "Profit and Loss." By turning the arrow one can also tell the correct entries to be made in closing the "Loss" of a business into the "Capital Account" or closing the "Profit" into the capital account. For example, to close "Expense" into "Profit and Loss," debit profit and loss and credit the expense account. To close "Income" into "Profit and Loss," debit income account and credit profit and loss. When the income and expense accounts have been summarized or put into the profit and loss account, the balance of the profit and loss account will then reflect either a debit or credit balance. Should the profit and loss account reflect a debit balance, this is an indication that the company has had more expenses than income which means that the company has sustained a loss during the fiscal period. To determine the proper entry for closing this entry into the capital account, turn the arrow to "Close—Loss into Capital." Through the window 42 can be seen the correct entry which is to "Credit" the profit and loss account and "Debit" the capital account.

Should the profit and loss account reflect a "Credit" balance, this is an indication that the company has had more income than expenses, which means that the company has experienced a profit during the fiscal period. To determine the proper entry for closing this profit into the capital account, turn the arrow to "To Close—Profit into Capital." Through the opening or window can then be seen the correct entry which is to "Debit" the profit and loss account and "Credit" the capital account.

The color plan employed in the bookkeeping aid is significant in that all income and liability columns are printed in red which here indicate that this is a credit or liability. The credit for income as well as the credit for liability indicates a minus figure, being a liability of the company to the owners of the company. In the general ledger or journal of the company's books, this figure is put down in black and white but is put in a credit column. By putting this figure down in a column printed in red or putting the figure itself in with a red pencil or pen, this would indicate in the student's mind further that the figure is a credit figure. Likewise a debit figure is normally written in black and white and if the debit figure and credit figure are both written in black and white, then these two figures are not as readily distinguishable as is the blank on white for debits and the red background or red figures themselves for credits.

When adding a credit figure to another credit figure, one would get a larger credit figure which acts the same as adding a minus to a minus. However, to add a minus to a plus, one would subtract. For example, on side A of the bookkeeping aid with the arrow pointing to "Credit"

which is in red, through the windows it will be noted that under "Income" and also under "Liabilities," the proper action is to add (notice the matching red colors). With the arrow on disk A pointing to "Debit" (black and white) through the windows it is noted that under "Expense" and "Assets," the proper action is to add inasmuch as the colors match. However, with the arrow on disk A pointing to "Credit" (red), it will be noted through the windows under "Expense" and "Assets," the proper action is to subtract inasmuch as the colors are contrasting. With the arrow on disk A turned to "Debit" (black and white), it is noted through the windows under "Income" and "Liabilities," that proper action is to subtract inasmuch as the colors contrast. Whenever using the structure, any matching colors are added and unmatching or contrasting colors are subtracted. This is also true under the closing entries and this is one of the features of the present invention which enable it to effectively teach students the various techniques and procedures employed in bookkeeping and will serve as a valuable aid in avoiding confusion as to proper entries to be made and where such entries are to be made and the effect of the various items in preparing a balance sheet and the like.

A structure of the bookkeeping aid is quite simple but yet dependable and long lasting and may be incorporated in other relatively movable members such as concentric cylinders longitudinally movable components and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bookkeeping aid comprising a center disk, an outer disk overlying one surface of the center disk and an inner disk underlying the opposite surface of the center disk, and means rotatably interconnecting said disks at the center thereof for enabling relative rotation therebetween, the outer and inner disk having a diameter less than the center disk thereby exposing a peripheral portion of the center disk around each surface thereof, said outer disk having a pair of diametrically opposed windows formed therein for revealing portions of the underlying surface of the center disk, said outer disk including an indicating arrow disposed thereon intermediate the windows and extending to the periphery thereof for indicating a portion of the periphery of the center disk, said inner disk having a single radially disposed window therein, and an indicating arrow thereon in alignment with the window and extending into the periphery of the inner disk in opposed relation to the window, each of said disks having an indicia thereon designating certain items and transactions encountered in bookkeeping, said items and transactions being oriented in corresponding relation to the location of such items and transactions in a conventional ledger and being color coded corresponding to entry of such items in a ledger.

2. The structure as defined in claim 1 wherein all debits are located to the left and all credits located to the right so that students may associate such items in the manner in which they normally appear in a ledger.

3. The structure as defined in claim 1 wherein all debit items are printed in black and white while the credit items are distinguishably colored by providing a red color thereto.

4. The structure as defined in claim 3 wherein the inner disk is provided with columns on which items appearing in various categories may be listed.

5. The structure as defined in claim 4 wherein said center disk is provided with areas of indicia thereon alignable with the arrow on the inner disk to enable disposition of items when entering closing entries at the end of a fiscal period.

6. The structure as defined in claim 5 wherein the color coding indicates to a student that items having the same color are added while items of contrasting colors are subtracted, whereby the association of colors with the structure will expedite the learning process of the student by making a visual and lasting impression by illustrating the theory of bookkeeping entries.

References Cited

UNITED STATES PATENTS 3,027,073 3/1962 Handelman _____ 116—133 X
3,249,085 5/1966 St. Jean _____ 35—74 X EUGENE R. CAPOZIO, *Primary Examiner.*

WILLIAM H. GRIEB, *Assistant Examiner.*

U.S. Cl. X.R.

35—74; 40—70; 116—133